United States Patent
Inayoshi et al.

(10) Patent No.: US 8,285,455 B2
(45) Date of Patent: Oct. 9, 2012

(54) SEAT BELT WARNING DEVICE

(75) Inventors: Muneto Inayoshi, Nagoya (JP); Akira Enomoto, Kariya (JP); Hiroyuki Fujii, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 202 days.

(21) Appl. No.: 12/823,792

(22) Filed: Jun. 25, 2010

(65) Prior Publication Data

US 2011/0012402 A1   Jan. 20, 2011

(30) Foreign Application Priority Data

Jul. 17, 2009   (JP) .................................. 2009-168424

(51) Int. Cl.
*B60R 22/00* (2006.01)
(52) U.S. Cl. .......................................... 701/45; 701/49
(58) Field of Classification Search .............. 701/45, 701/36
See application file for complete search history.

(56) References Cited

U.S. PATENT DOCUMENTS 7,830,246 B2 * 11/2010 Hawkins .................... 340/457.1
7,831,359 B2 * 11/2010 Sugawara et al. ............... 701/45

FOREIGN PATENT DOCUMENTS

JP          9-207638 A     8/1997

* cited by examiner

*Primary Examiner* — Thomas Tarcza
*Assistant Examiner* — Tyler J Lee
(74) *Attorney, Agent, or Firm* — Buchanan Ingersoll & Rooney PC

(57) ABSTRACT

A seat belt warning device includes a seat belt restraining and releasing a passenger seated on a seat for a vehicle, a load detecting device including two load sensors that are provided at a rear portion of the seat, a warning member warning a passenger to fasten the seat belt, and a controlling portion determining one of an unoccupied-seat recognition mode, a passenger seating recognition mode, and a luggage recognition mode. The controlling portion performs a first transition process in which the unoccupied-seat recognition mode is shifted to the luggage recognition mode and in which the luggage recognition mode is shifted to the unoccupied-seat recognition mode. The controlling portion performs a second transition process in which the unoccupied-seat recognition mode is shifted to the passenger seating recognition mode and in which the passenger seating recognition mode is shifted to the unoccupied-seat recognition mode.

12 Claims, 7 Drawing Sheets

SEAT BELT WARNING DEVICE

CROSS REFERENCE TO RELATED APPLICATIONS

This application is based on and claims priority under 35 U.S.C. §119 to Japanese Patent Application 2009-168424, filed on Jul. 17, 2009 the entire content of which is incorporated herein by reference.

TECHNICAL FIELD

This disclosure relates to a seat belt warning device.

BACKGROUND DISCUSSION

In a case where a passenger seated on a seat for a vehicle does not fasten a seat belt, the passenger may be warned by a buzzer and the like so as to fasten the seat belt. Then, a load detecting device for detecting a load of the passenger seated on the seat is provided at the seat. When the load detected by the load detecting device is greater than a predetermined threshold value, it is determined that the passenger is seated on the seat. On the other hand, when the load detected by the load detecting device is equal to or smaller than the threshold value, it is determined that the passenger is not seated on the seat.

Load sensors constituting the load detecting device, which are disclosed in JPH09-207638A, for example, are arranged at four portions, respectively, between a seat-side fixing member for supporting a seat for a vehicle and a floor-side fixing member for fixing the seat-side fixing member to a floor of the vehicle, while having a predetermined distance therebetween in a longitudinal direction and a width direction of the vehicle. Even when the passenger is seated in any posture on the seat, the load of the passenger is accurately detectable on a basis of sum of outputs from the four load sensors.

As illustrated in FIG. 8, in a case where the load detected by the load detecting device is equal to or greater than 18 kg, for example, and such detection elapses for 0.5 sec, it is determined that the passenger is seated on the seat (passenger seated state). At this time, when the passenger does not fasten the seat belt, a warning member warns the passenger to fasten the seat belt. In a case where the load detected by the load detecting device is smaller than 5 kg, for example, and such detection elapses for 0.5 sec, it is determined that no passenger is seated on the seat (no passenger seated state) and the warning member is prohibited to operate.

In order to reduce a cost of manufacturing, the number of load sensors constituting the load detecting device is reduced to two by which the load of the passenger seated on the seat is detected. However, in a case where the two load sensors are provided at the rear-left and rear-right portions of the seat, the load detected by the load detecting device fluctuates, depending on how the load is applied to the seat, which may prevent an accurate determination of seat occupancy.

For example, whether the passenger is seated at a forward portion of a seat cushion or seated back on the seat cushion leads to a difference in the load detected by the load detecting device. As illustrated in a transition state of FIG. 8, the determination is frequently switched between the passenger seated state and the no passenger seated state.

The frequent switching between the passenger seated state and the no passenger seated state may occur not only depending on how the passenger is seated on the seat but also when the vehicle is driven with luggage placed on the seat (passenger seat), for example. That is, in a case where luggage is placed on the seat in a normal condition, the load detected by the load detecting device is prevented from exceeding a threshold value (i.e., 18 kg) for determining the passenger seated on the seat. Thus, the warning for the passenger who does not fasten the seat belt is not activated. However, when the vehicle is suddenly accelerated and the acceleration is applied to the seat, for example, the load of luggage is applied to the rear portion of the seat. Then, the load detected by the load detecting device may exceed the threshold value for determining the passenger seated on the seat. In such case, nevertheless the passenger is not seated on the seat, the warning for the passenger to fasten the seat belt is mistakenly activated. Afterwards, when the acceleration acting on the vehicle decreases, the load detected by the load detecting device becomes smaller than the threshold value so that the warning for the passenger to fasten the seat belt is stopped. When the acceleration again acts on the seat, the warning for the passenger to fasten the seat belt is again activated.

Accordingly, even when the luggage is placed on the passenger seat, the determination is frequently switched between the passenger seated state and the no passenger seated state depending on a driving state of the vehicle. The warning for the passenger to fasten the seat belt is repeatedly activated, which results in an uncomfortable feeling of the passenger such as a driver, and the like.

A need thus exists for a seat belt warning device which is not susceptible to the drawback mentioned above.

SUMMARY

According to an aspect of this disclosure, a seat belt warning device includes a seat belt restraining a passenger seated on a seat for a vehicle when the seat belt is in an engagement state and releasing the passenger when the seat belt is in a disengagement state, a load detecting device including two load sensors that are provided at a rear portion of the seat and that are arranged away from each other in a width direction of the vehicle, the load detecting device detecting a load applied to a seating surface of the seat, the seat including a seatback at the rear portion of the seat, a warning member warning the passenger to fasten the seat belt in response to the load detected by the load detecting device, and a controlling portion determining one of an unoccupied-seat recognition mode where an unoccupied-seat state is recognized, a passenger seating recognition mode where it is determined that the passenger is seated on the seat and the warning member is allowed to operate, and a luggage recognition mode where it is determined that luggage is placed on the seat and the warning member is prohibited to operate. The controlling portion performs a first transition process in which the unoccupied-seat recognition mode is shifted to the luggage recognition mode under a condition where the load detecting device detects the load greater than a first load and smaller than a second load and in which the luggage recognition mode is shifted to the unoccupied-seat recognition mode under a condition where the load detecting device detects the load smaller than a third load for a predetermined first time period. The controlling portion performs a second transition process in which the unoccupied-seat recognition mode is shifted to the passenger seating recognition mode under a condition where the load detecting device detects the load equal to or greater than the second load and in which the passenger seating recognition mode is shifted to the unoccupied-seat recognition mode under a condition where the load detecting device detects the load smaller than the third load for the predetermined first time period.

According to another aspect of the disclosure, a seat belt warning device includes a seat belt restraining a passenger seated on a seat for a vehicle when the seat belt is in an engagement state and releasing the passenger when the seat belt is in a disengagement state, a load detecting device including two load sensors that are provided at a rear portion of the seat and that are arranged away from each other in a width direction of the vehicle, the load detecting device detecting a load applied to a seating surface of the seat, the seat including a seatback at the rear portion of the seat, a warning member warning the passenger to fasten the seat belt in response to the load detected by the load detecting device, and a controlling portion determining one of an unoccupied-seat recognition mode where an unoccupied-seat state is recognized, a passenger seating recognition mode where it is determined that the passenger is seated on the seat and the warning member is allowed to operate, and a luggage recognition mode where it is determined that luggage is placed on the seat and the warning member is prohibited to operate. The controlling portion performs a first transition process in which the unoccupied-seat recognition mode is shifted to the luggage recognition mode under a condition where the load detecting device detects the load greater than a first load and smaller than a second load within a predetermined second time period after an ignition switch is turned on and in which the luggage recognition mode is shifted to the unoccupied-seat recognition mode under a condition where the load detecting device detects the load smaller than a third load for a predetermined first time period. The controlling portion performs a second transition process in which the unoccupied-seat recognition mode is shifted to the passenger seating recognition mode under a condition where the load detecting device detects the load equal to or greater than the second load within the predetermined second time period after the ignition switch is turned on and in which the passenger seating recognition mode is shifted to the unoccupied-seat recognition mode under a condition where the load detecting device detects the load smaller than the third load for the predetermined first time period.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
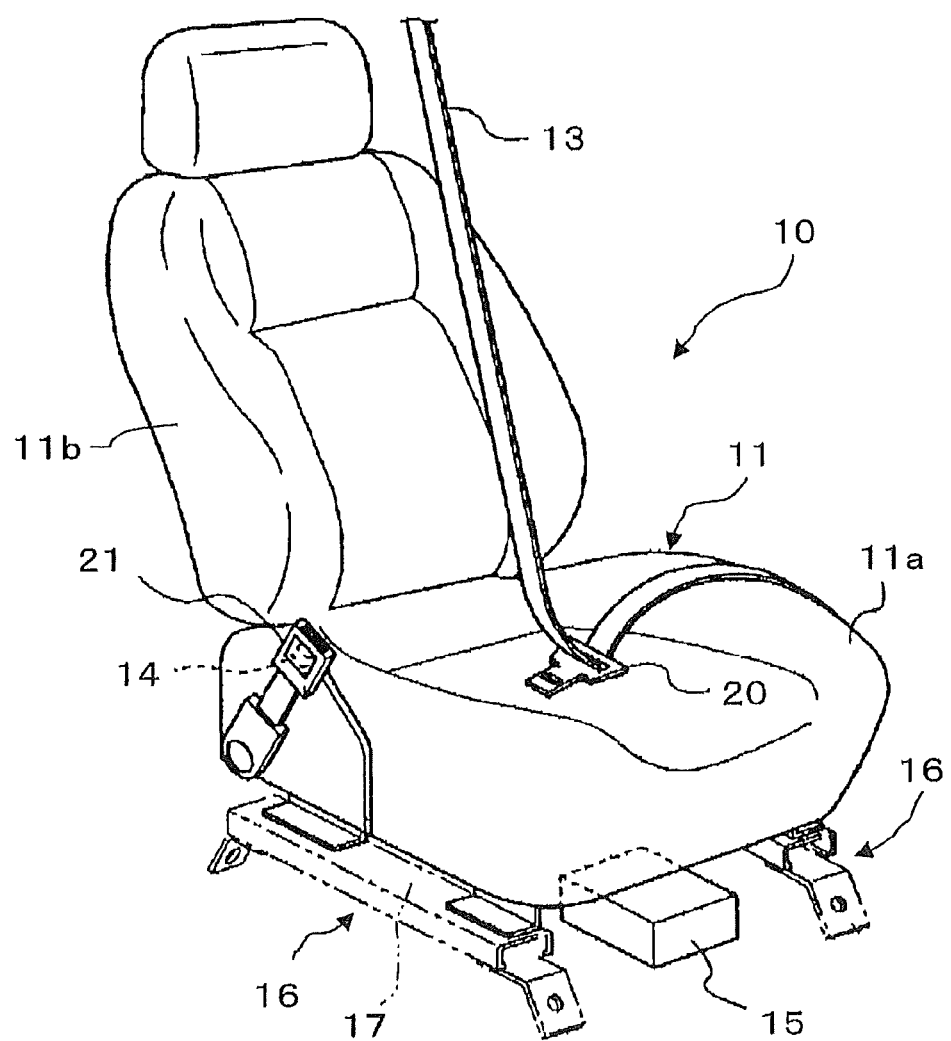
FIG. 1 is a perspective view of a seat for a vehicle including a seat belt warning device according to a first embodiment disclosed here.

A first embodiment disclosed here will be explained with reference to the attached drawings. FIG. 1 illustrates a front passenger seat for a vehicle 11 (hereinafter simply referred to as a seat 11) at which a seat belt warning device 10 is mounted. The seat 11 includes a seat cushion 11a serving as a seating surface on which a passenger (i.e., a seat occupant) is seated and a seat back 11b attached to a rear portion of the seat cushion 11a so as to be rotatable in a longitudinal direction of the vehicle. In addition, a load detecting device 12 (see FIGS. 2 and 3) for detecting a load of a passenger or luggage seated or placed on the seat 11, a seat belt 13 for restraining and releasing the passenger when the seat belt 13 is in an engagement state and a disengagement state, respectively, a buckle switch 14 for detecting whether the seat belt 13 is in the engagement state or the disengagement state, and a controller 15 are provided at the seat 11. In the following, directions and orientations such as left, right, front, rear, top, and bottom correspond to those when viewed from a passenger seated on the seat 11.

Figure 2:
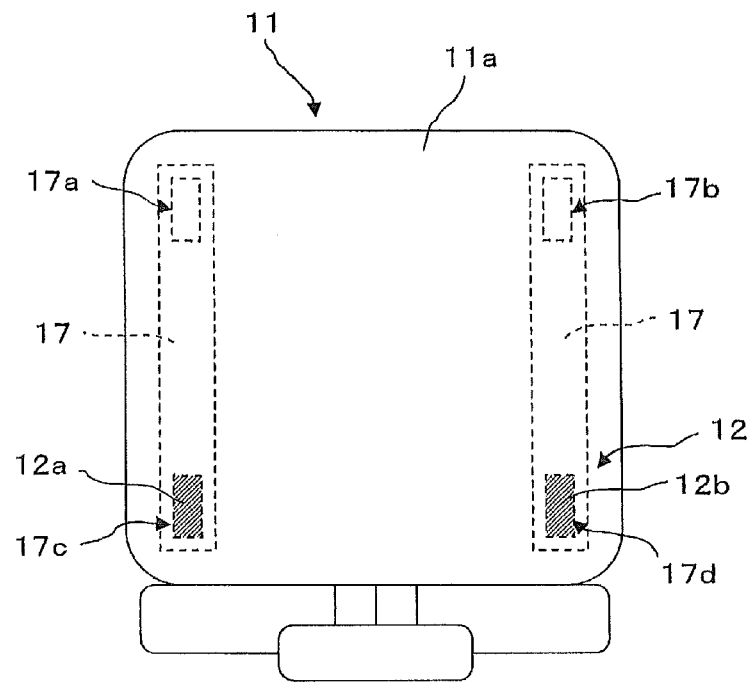
FIG. 2 is a top view of the seat illustrated in FIG. 1.

The seat 11 is supported by a floor of a vehicle by means of a pair of upper rails (i.e., left and right upper rails) 17 constituting a seat slide apparatus 16 that supports the seat 11 so that the position of the seat 11 is adjustable in the longitudinal direction of the vehicle. As illustrated in FIG. 2, four support legs 17a, 17b, 17c, and 17d supporting the seat cushion 11a are provided on the left and right upper rails 17. Specifically, the support legs 17a, 17b, 17c, and 17d are arranged at front-left, front-right, rear-left, and rear-right corners of the seat cushion 11a so as to be away from each other in the longitudinal direction and a width direction of the vehicle. Two load sensors, i.e., first and second load sensors 12a and 12b, constituting the load detecting device 12, are formed by strain gauge sensors each incorporating therein an amplifier. The first and second load sensors 12a and 12b are provided at the rear left and right support portions, i.e., the support legs 17c and 17d according to the present embodiment, and are disposed between the seat cushion 11a and the left and right upper rails 17, respectively. The first and second load sensors 12a and 12b detect the load of the passenger and the like seated on the seat cushion 11a of the seat 11.

As illustrated in FIG. 1, the seat belt 13 includes a tongue plate 20 at a middle portion thereof. A buckle 21 that is engageable and disengageable relative to the tongue plate 20 is provided at a side portion of the seat cushion 11a. The buckle 21 incorporates therein the buckle switch 14. In a case where the tongue plate 20 engages with the buckle 21, the buckle switch 14 outputs an ON signal indicating the engagement state of the seat belt 13. On the other hand, in a case where the tongue plate 20 disengages from the buckle 21, the buckle switch 14 outputs an OFF signal indicating the disengagement state of the seat belt 13.

Figure 3:
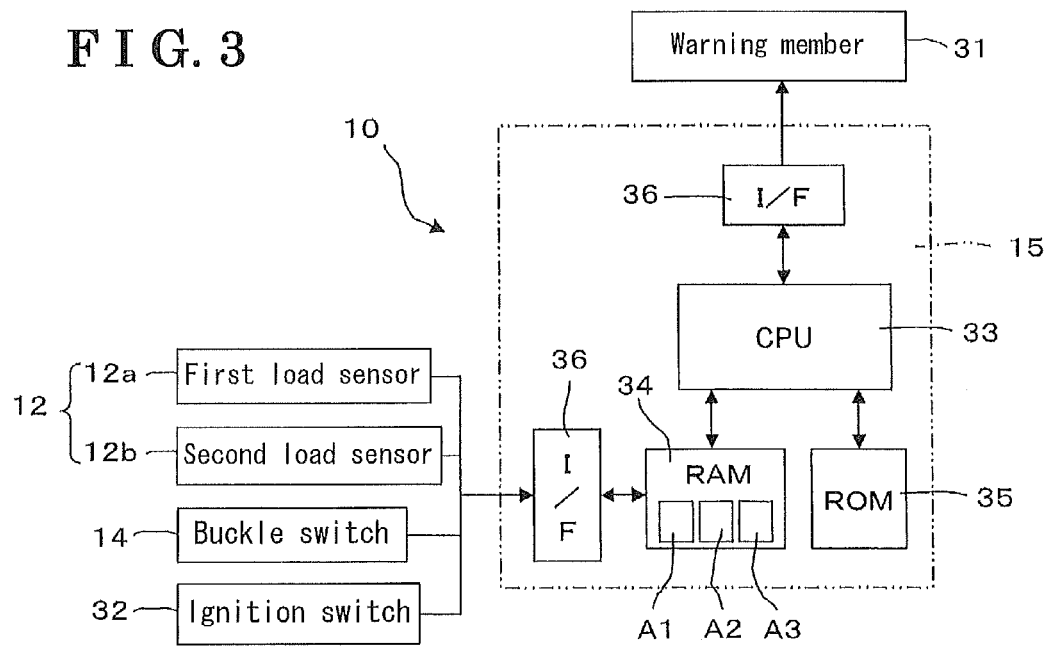
FIG. 3 is a block diagram of the seat belt warning device.

FIG. 3 is a block diagram of the seat belt warning device 10. As illustrated in FIG. 3, the first and second load sensors 12a and 12b constituting the load detecting device 12, the buckle switch 14 of the seat belt 13, and a warning member 31 warning the disengagement state of the seat belt 13 by means of a buzzer, an indicator lamp, and the like, are connected to the controller (ECU) 15 serving as a controlling portion. The warning member 31 emits a warning to encourage the passenger to fasten the seat belt 13 when the passenger who is seated on the seat cushion 11a does not fasten the seat belt 13 (i.e., the seat belt 13 is in the disengagement state and the buckle switch 14 is in the OFF state).

The controller 15 includes a CPU 33, a RAM 34, a ROM 35, and interfaces 36. The ROM 35 stores a seat occupancy determination program. The RAM 34 receives load signals detected by the first and second load sensors 12a and 12b, an ON/OFF signal of the buckle switch 14 of the seat belt 13, and an ON/OFF signal of an ignition switch 32 via the interface 36.

The CPU 33 adds up both the load signals sent from the load sensors 12a and 12b to the RAM 34 to thereby detect a weight of the passenger or luggage seated or placed on the seat 11. For example, in a case where the passenger or the like is seated on the seat 11 in the normal or appropriate posture, the substantially even load is applied to each of the first and second load sensors 12a and 12b provided at the rear-left and rear-right portions of the seat cushion 11a. In a case where the passenger or the like is seated, leaning to one side (left or right) of the seat 11, the greater load is applied to one of the first and second load sensors 12a and 12b while the smaller load is applied to the other of the first and second load sensors 12a and 12b. Then, the CPU 33 adds up both the load signals from the first and second load sensors 12a and 12b, thereby detecting the weight of the passenger or luggage on the seat 11. At this time, a zero-point correction is performed beforehand on outputs of the load sensors 12a and 12b in a vacant state of the seat 11 where no passenger or luggage is seated or placed on the seat cushion 11a and in a state where the vehicle is positioned on a horizontal plane.

The RAM 34 includes a first storage area A1 storing an unoccupied-seat recognition mode in which it is determined that no passenger or luggage is seated or placed on the seat 11 (i.e., an unoccupied-seat state), a second storage area A2 storing a passenger seating recognition mode in which it is determined that the passenger is seated on the seat 11 (i.e., a passenger detected state) and thus the warning member 31 is permitted to operate, and a third storage area A3 storing a luggage recognition mode in which it is determined that the luggage is placed on the seat 11 (i.e., a luggage detected state) and thus the warning member 31 is prohibited to operate.

In a case where the two load sensors 12a and 12b are provided at the rear-left and rear-right portions of the seat 11, the weight of luggage placed on the seat cushion 11a, for example, is detectable by the two load sensors 12a and 12b in a normal driving state of the vehicle, and therefore the aforementioned case is easily differentiated from a case where the passenger is seated on the seat 11. However, in a case where the vehicle is suddenly accelerated or the like and thus the acceleration acts on the seat or the vehicle is driven uphill, the weight of the luggage on the seat cushion 11a is applied to the rear portion thereof to a greater extent. As a result, the load detected by the load detecting device 12 is greater than the actual weight of the luggage.

Accordingly, when the luggage is placed on the seat 11 and the weight of the luggage is accurately detected in the normal driving state of the vehicle, the load detected by the load detecting device 12 is smaller than a threshold value for determining that the passenger is seated on the seat 11. Thus, the warning member 31 is prevented from emitting a warning signal. On the other hand, in a case where the load detected by the load detecting device 12 is greater than the actual weight of the luggage because of the acceleration of the vehicle, the driving on the uphill, and the like, and thus exceeds the threshold value, the warning member 31 mistakenly emits the warning signal against the disengagement state of the seat belt 13.

Figure 4:
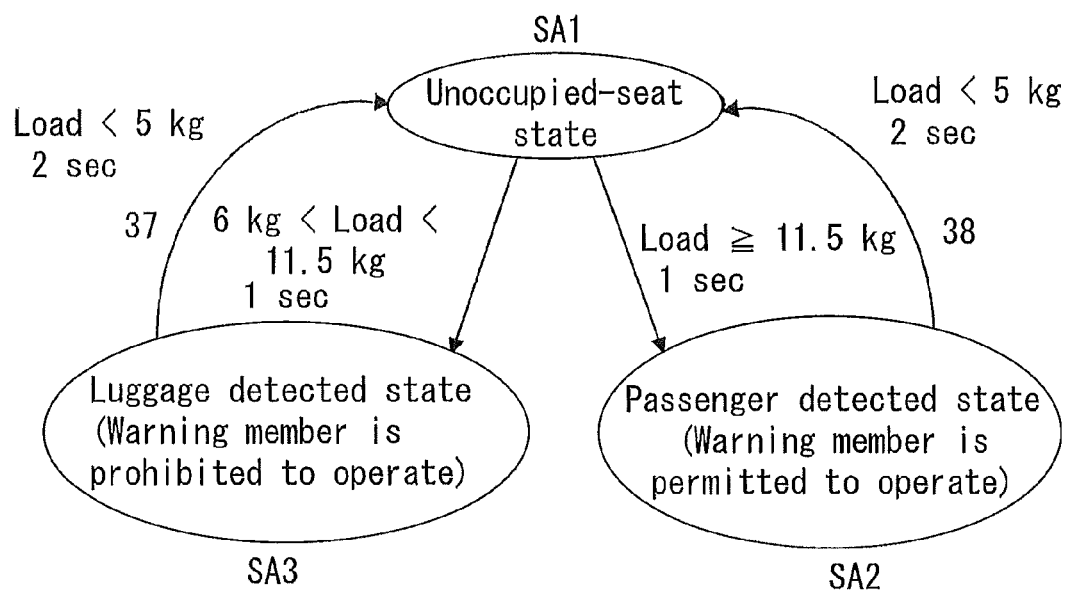
FIG. 4 is a diagram illustrating a transition state of a determination of seat occupancy by the seat belt warning device according to the first embodiment.

Thus, as illustrated in FIG. 4, an unoccupied-seat state (unoccupied-seat recognition mode) SA1 where no passenger or luggage is seated or placed on the seat cushion 11a of the seat 11, a passenger detected state (passenger seating recognition mode) SA2 where the passenger is seated on the seat cushion 11a of the seat 11, and a luggage detected state (luggage recognition state) SA3 where the luggage is placed on the seat cushion 11a of the seat 11 are determined according to the present embodiment. In the unoccupied-seat state SA1, the luggage detected state SA3 is determined when the load within a predetermined range is detected, and the passenger detected state SA2 is determined when the load exceeding the predetermined range is detected. After such determination, unless the passenger or luggage on the seat 11 is changed, the transition of the determination of seat occupancy is prevented.

As illustrated in FIG. 4, the controller 15 according to the present embodiment performs a first transition process 37 and a second transition process 38. In the first transition process 37, the unoccupied-seat recognition mode (i.e., the unoccupied-seat state SA1) is shifted to the luggage recognition mode (i.e., luggage detected state SA3) under a condition that the load detecting device 12 detects a load greater than a first load (for example, 6 kg) and smaller than a second load (for example, 11.5 kg) for a predetermined second time period (for example, 1 sec). In addition, in the first transition process 37, the luggage recognition mode is shifted to the unoccupied-seat recognition mode under a condition that the load detecting device 12 detects a load smaller than a third load (for example, 5 kg) approximated to the first load for a predetermined first time period (for example, 2 sec).

In the second transition process 38, the unoccupied-seat recognition mode is shifted to the passenger seating recognition mode under a condition where the load detecting device 12 detects a load equal to or greater than the second load (11.5 kg) for the second time period (1 sec). In addition, in the second transition process 38, the passenger seating recognition mode is shifted to the unoccupied-seat recognition mode under a condition where the load detecting device 12 detects a load smaller than the third load, approximated to the first load, for the first time period (2 sec).

Accordingly, the transition of the determination of the seat occupancy is avoidable between the passenger detected state SA2 and the luggage detected state SA3. Even when the weight of the load detected by the load detecting device 12 is greater than the actual weight of the luggage, the warning signal against the disengagement state of the seat belt 13 is prevented from being mistakenly emitted.

According to the present embodiment, the passenger detected state SA2 is determined when the load detecting device 12 detects the load equal to or greater than 11.5 kg. This is because cases where children of 6 years or older, females each having a relatively small physique, and the like are seated on the forward portion of the seat are detectable as the passenger detected state SA2. In addition, according to the present embodiment, the luggage detected state SA3 is determined when the load detecting device 12 detects the load greater than 6 kg and smaller than 11.5 kg, thereby avoiding a wrong recognition of the luggage to be the passenger, which is caused by the load acting on the vehicle such as the acceleration.

Next, the seat occupancy determination program according to the first embodiment will be explained with reference to a flowchart shown in FIG. 5. When the ignition switch 32 (see FIG. 3) is turned on, the seat occupancy determination program is started. The seat occupancy determination program is repeatedly conducted each predetermined sampling period. In step S100, the unoccupied-seat state SA1 is determined. In step S102, it is determined whether or not the load detected by the load detecting device 12 is greater than 6 kg (i.e., the first load). When it is determined that the detected load is greater than 6 kg (i.e., the positive determination is made in step 102), then it is determined whether or not the detected load is smaller than 11.5 kg (i.e., the second load) in step S104. When the positive determination is made in step S104, i.e., when it is determined that the detected load by the load detecting device 12 falls within a predetermined range from more than 6 kg to less than 11.5 kg, then it is determined whether the determination result in step S104 is maintained for a predetermined time period, for example, 1 sec (second time period) in step S106. When the positive determination is made in step S106, it is determined that luggage is placed on the seat 11 in step S108. The luggage detected state SA3, i.e., the luggage recognition mode is stored. When the luggage detected state SA3 is stored, the warning member 31 is turned off so that the warning member 31 is prohibited to operate.

On the other hand, when the negative determination is made in step S104, i.e., when it is determined that the detected load by the load detecting device 12 is equal to or greater than 11.5 kg, then it is determined whether the determination result in step S104 is maintained for 1 sec in step S110. When the positive determination is made in step S110, it is determined that the passenger is seated on the seat 11 in step S112. The passenger detected state SA2, i.e., the passenger seating recognition mode is stored. When the passenger detected state SA2 is stored, the warning member 31 is turned on so that the warning member 31 is allowed to operate.

When the negative determination is made in step S106 or step S110, i.e., when the load within the predetermined range or the load out of the predetermined range is prevented from continuing for 1 sec, a flow operation is returned to step S100 and the unoccupied-seat state SA1 is determined.

The transition of the determination of the seat occupancy from the unoccupied-seat state SA1 to the passenger detected state SA2 or to the luggage detected state SA3 may be performed only within the second time period (1 sec) as a minimum requirement for the vehicle to start from the ON state of the ignition switch 32. Accordingly, the transition of the determination of seat occupancy state is achievable while the vehicle is being stopped. That is, the load applied to the seat cushion 11a is detectable while the acceleration and the like is not acting on the seat 11. Because of the aforementioned condition, the transition of the determination of the seat occupancy is prevented after the vehicle is started (for example, after the elapse of 2 sec from the start of the vehicle), excluding a case where the passenger on the seat cushion 11a of the seat 11 is changed, which will be explained later. As a result, the further accurate determination of the seat occupancy is achievable.

When the passenger detected state SA2 is stored in step S112, it is determined whether or not the load detected by the load detecting device 12 is smaller than 5 kg, for example, and that detected state is maintained for 2 sec (first time period), for example, in step S118 and S120, respectively. In a case where the passenger seated on the seat 11 gets out of the vehicle and the seat 11 becomes vacant, for example, the load applied to the seat 11 becomes smaller than 5 kg. When the aforementioned state is maintained for 2 sec, it is determined that no passenger or luggage is seated or placed on the seat 11 in step S122. Accordingly, the passenger detected state SA2 is shifted to the unoccupied-seat state SA1. In step S118 and step 120, when the load detected by the load detecting device 12 is not smaller than 5 kg or the state where the detected load is smaller than 5 kg does not elapse for 2 sec, the passenger detected state SA2 is retained.

In the same way, when the luggage detected state SA3 is stored in step S108, it is determined whether or not the load detected by the load detecting device 12 is smaller than 5 kg, for example, and that detected state is maintained for 2 sec (first time period), for example, in step S114 and S116, respectively. In a case where the vehicle is stopped and the luggage placed on the seat 11 is removed therefrom, for example, the load applied to the seat 11 becomes smaller than 5 kg. When the aforementioned state is maintained for 2 sec, it is determined that no luggage or passenger is placed or seated on the seat 11, i.e., the unoccupied-seat state SA1 is determined in step S122. As a result, the luggage detected state SA3 is shifted to the unoccupied-seat state SA1. In step S114 and step S116, when the load detected by the load detecting device 12 is not smaller than 5 kg or the state where the detected load is smaller than 5 kg does not elapse for 2 sec, the luggage detected state SA3 is retained.

Figure 5:
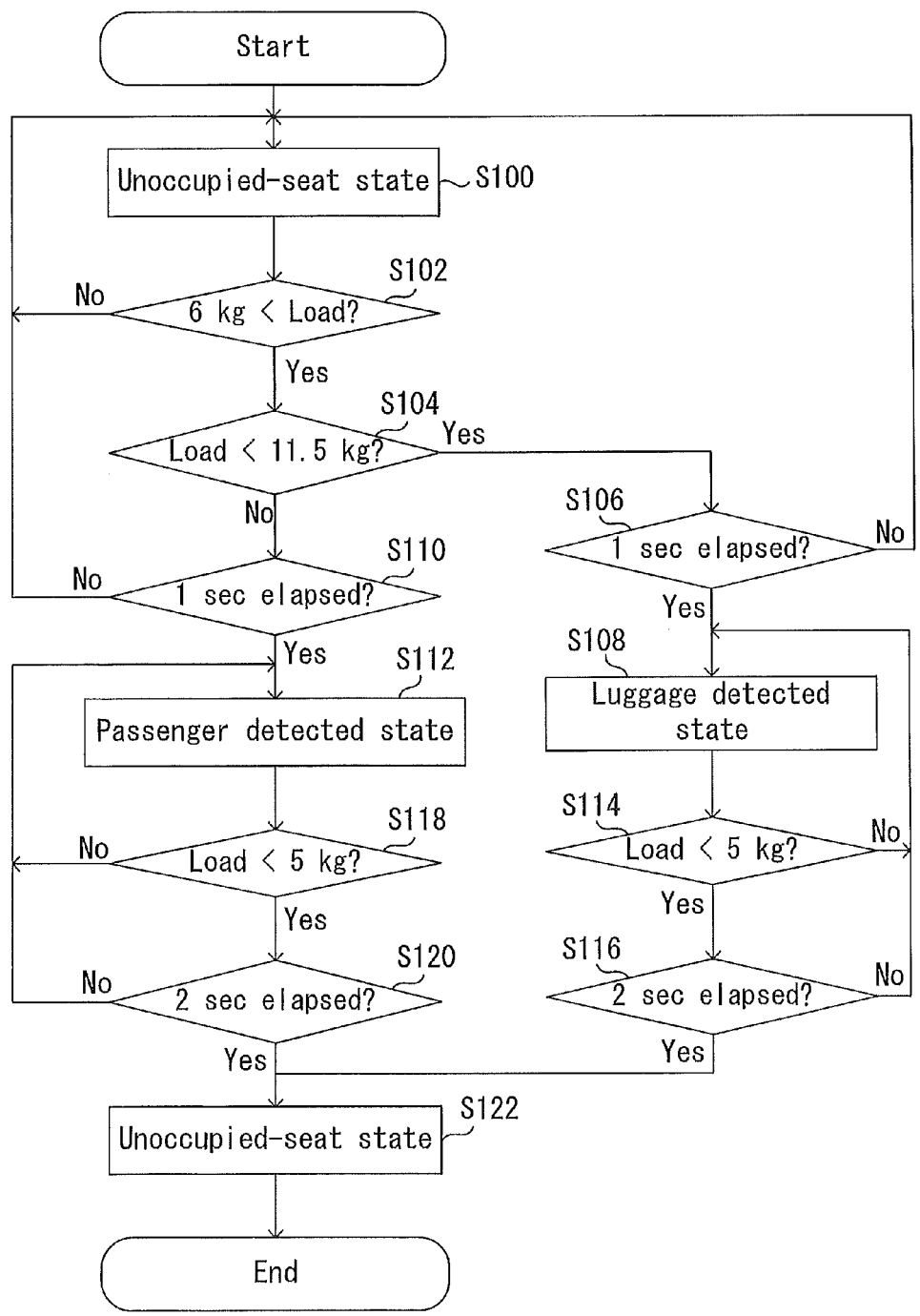
FIG. 5 is a flow chart explaining a seat occupancy determination program performed by the seat belt warning device according to the first embodiment.

As illustrated in FIGS. 4 and 5, in a case where the passenger detected state SA2 or the luggage detected state SA3 is determined when the vehicle is stopped, its determination result thereafter is substantially prevented from being shifted. Only when the state where the detected load is smaller than the third load (5 kg) is maintained for the first time period (2 sec), the determination is shifted to the unoccupied-seat state SA1. Accordingly, once the determination of the seat occupancy is conducted, the determination is prevented from being shifted between the passenger detected state SA2 and the luggage detected state SA3.

Therefore, according to the first embodiment, even when the load detected by the load detecting device 12 is greater than the threshold value for determining that the passenger is seated on the seat 11 because of an influence of the acceleration and the like applied to the vehicle, the wrong recognition that the passenger is seated on the seat is avoidable. The warning signal indicating the disengagement state of the seat belt is prevented from being mistakenly emitted.

In addition, according to the first embodiment, either the luggage detected state SA3 or the passenger detected state SA2 is once concluded, the determination is prevented from being frequently changed. Thus, the passenger is prevented from having an uncomfortable feeling caused by a repetition of the warning indicating the disengagement state of the seat belt, which achieves an appropriate seat belt warning.

Next, a second embodiment will be explained with reference to FIG. 6. In a case where the vehicle is stopped on a downhill surface, the load of the passenger or luggage seated or placed on the seat 11 is applied to a greater extent to the front portion of the seat 11. Then, the load detected by the load detecting device 12 tends to be smaller relative to the actual weight of the passenger or luggage. Thus, according to the second embodiment, the load detected by the load detecting device 12 is corrected depending on the degree of the downhill surface.

Figure 6:
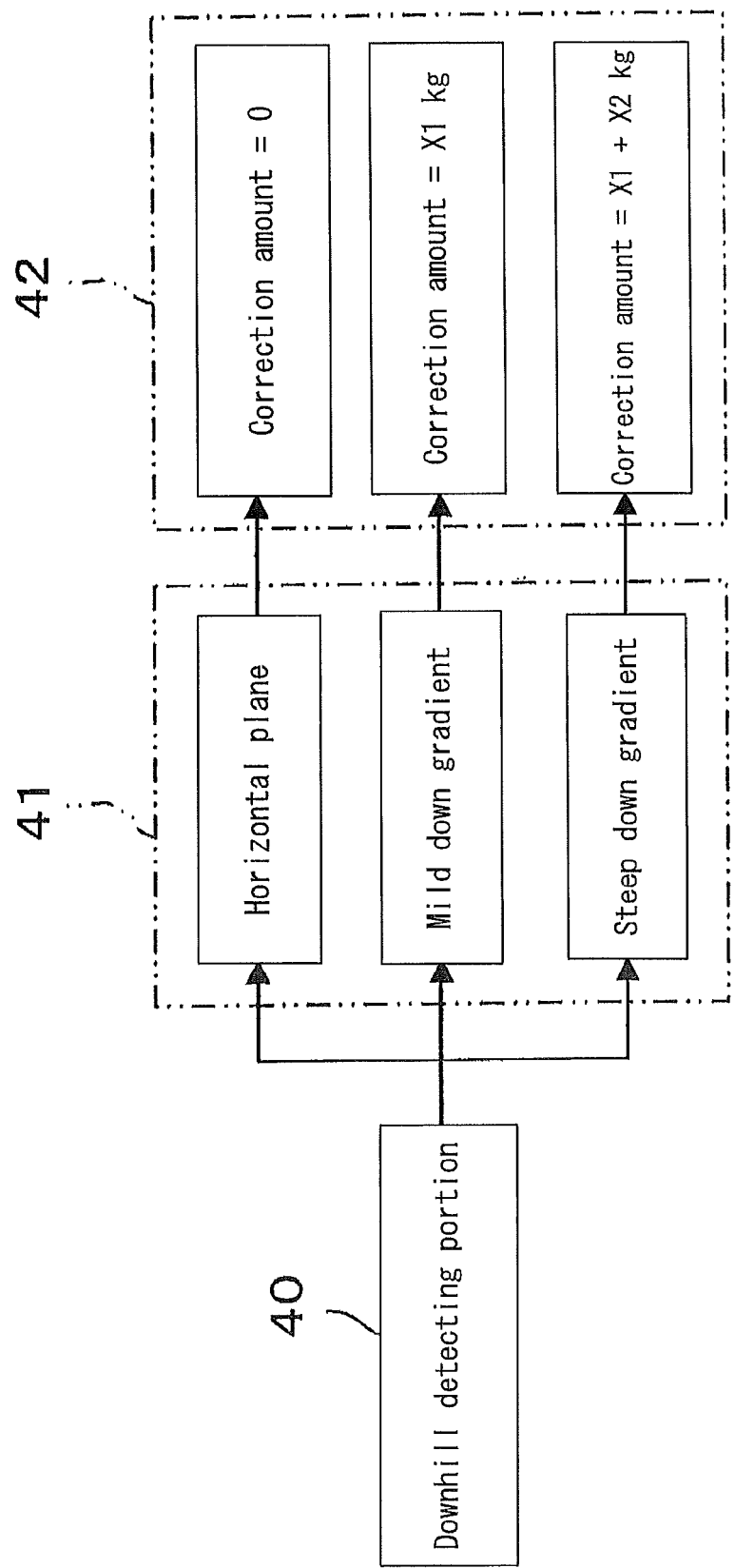
FIG. 6 is a diagram illustrating a load correction performed by the seat belt warning device according to a second embodiment disclosed here.

As illustrated in FIG. 6, the second embodiment includes a downhill detecting portion 40 detecting that the vehicle is stopped on a downhill surface, a downhill grade determining portion 41 determining the degree of the downhill surface on which the vehicle is stopped on the basis of a detection result of the downhill detecting portion 40, and a load value correcting portion 42 correcting a load (load value) depending on a determination result of the downhill grade determining portion 41.

The downhill detecting portion 40 is constituted by an inclination sensor for detecting an inclination state of the vehicle in the longitudinal direction thereof. The downhill degree determining portion 41 determines whether the road on which the vehicle is stopped has a horizontal plane, a mild down gradient, or a steep down gradient, based on an inclination angle detected by the inclination sensor. Then, in response to the determination result of the downhill degree determining portion 41, the load detected by the load detecting device 12 is corrected by the load value correcting portion 42. Specifically, a correction amount when the horizontal plane is determined is defined to be zero. Then, when the mild down gradient is determined, a first correction amount X1 is added to the load detected by the load detecting device 12. When the steep down gradient is determined, a second correction amount X2 is added to the load detected by the load detecting device 12 in addition to the first correction amount X1.

Accordingly, at a time when the mild down gradient is determined, the passenger detected state is determined in a case where a load value obtained by an addition of the first correction amount X1 (kg) to the load detected by the load detecting device 12 is equal to or greater than 11.5 kg. The luggage detected state is determined in a case where the load value obtained by an addition of the first correction amount X1 (kg) to the load detected by the load detecting device 12 falls within the predetermined range from more than 6 kg to less than 11.5 kg. In the same way, at a time when the steep down gradient is determined, the passenger detected state is determined in a case where a load value obtained by an addition of the first correction amount X1 (kg) and the second correction amount X2 (kg) to the load detected by the load detecting device 12 is equal to or greater than 11.5 kg. The luggage detected state is determined in a case where the load value obtained by an addition of the first correction amount X1 (kg) and the second correction amount X2 (kg) to the load detected by the load detecting device 12 falls within the predetermined range from more than 6 kg to less than 11.5 kg.

According to the second embodiment, it is determined that the vehicle is stopped on the downhill surface. Then, the load detected by the load detecting device 12 is corrected depending on the degree of the downhill surface. Therefore, regardless of the inclination state of the vehicle, the determination of the unoccupied-seat state, the passenger detected state, or the luggage detected state is accurately performed.

The downhill detecting portion 40 may not be constituted by the inclination sensor. The downhill detecting portion 40 may be achieved by the load detected by the load detecting device 12 in a vacant state of the seat 11, i.e., no seat occupancy of the seat cushion 11a (the passenger is not seated on the seat 11). That is, when the vehicle is stopped on the downhill surface, the load of the seat 11 received by the load detecting device 12, which is provided at the rear portion of the seat cushion 11a, becomes small. An output value of the load detecting device 12, on which a zero-point correction is performed, turns to be a negative value. Therefore, on the downhill surface, the output value of the load detecting device 12 increases to the negative side in association with an increase of the down gradient. The determination of the horizontal plane, the mild down gradient, or the steep down gradient is performed on the basis of the magnitude of the negative value of the output of the load detecting device 12.

Figure 7:
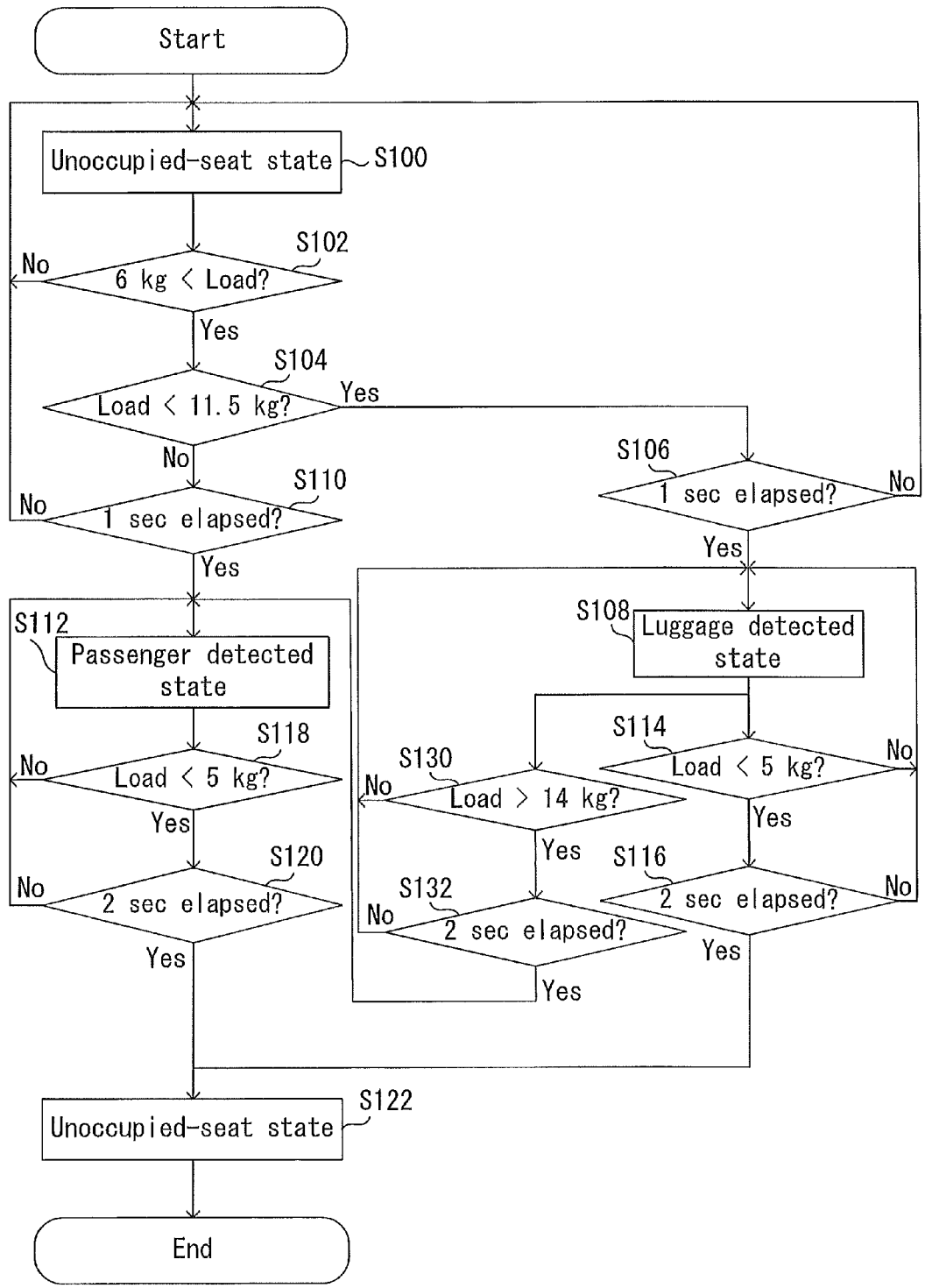
FIG. 7 is a flow chart explaining the seat occupancy determination program performed by the seat belt warning device according to a third embodiment disclosed here.
Figure 8:
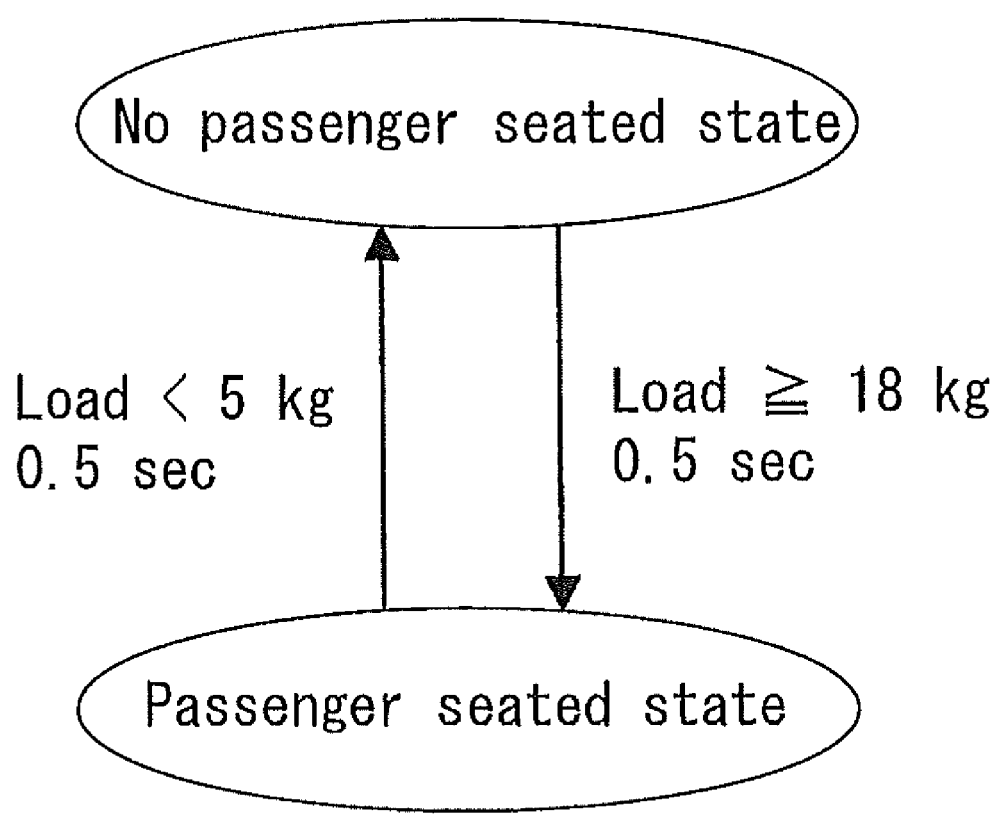
FIG. 8 is a diagram illustrating a transition state of a determination of seat occupancy by a seat belt warning device according to a conventional device.

A third embodiment will be explained with reference to FIG. 7. The third embodiment differs from the first embodiment in an addition of steps S130 and S132 between step S108 where the luggage detected state is determined and step S112 where the passenger detected state is determined. Then, a third transition process is exceptionally performed for shifting from the luggage detected state to the passenger detected state. The other structures of the third embodiment are the same as those of the first embodiment. Thus, only the difference of the third embodiment from the first embodiment will be explained below and the same reference numerals are applied to the same structures.

According to the aforementioned first embodiment, once the luggage detected state is determined, the determination is never changed to the passenger detected state. In a case where a child is seated on the forward portion of the seat cushion 11a at an early stage of the seat occupancy determination program, for example, the output of the load detecting device 12 is prevented from reaching the second load (11.5 kg), which results in the determination of the luggage detected state. When the child changes his/her seating position to be seated in an appropriately manner on the seat cushion 11a and thereafter the output of the load detecting device 12 becomes equal to or greater than the second load (11.5 kg), the determination of the luggage detected state is never shifted to the passenger detected state. As a result, the warning against the disengagement state of the seat belt is not conducted.

Therefore, the aforementioned situation is considered in the third embodiment. As illustrated in FIG. 7, even the luggage detected state is once determined in step S108, the determination is shifted to the passenger detected state from the luggage detected state in a case where it is determined that the load detected by the load detecting device 12 is greater than a fourth load, for example, 14 kg that is greater than the second load (11.5 kg) in step S130 and the state is maintained for a predetermined third time period, for example, 2 sec or more, in step S132.

Accordingly, because the third transition process for shifting from the luggage detected state to the passenger detected state is added in the third embodiment, even when the luggage detected state is determined by the child seated on the forward portion of the seat cushion 11a, the determination is shifted from the luggage detected state to the passenger detected state when the child then changes his/her position to be seated in an appropriate manner on the seat cushion 11a. As a result, the warning against the disengagement of the seat belt is appropriately performed.

In the aforementioned case, when the child is again seated on the forward portion of the seat cushion 11a so that the output of the load detecting device 12 becomes smaller than the second load (11.5 kg) and greater than the first load (6 kg), the determination is prevented from being shifted from the passenger detected state to the luggage detected state. The frequent change of the determination that appears in the conventional device is avoidable according to the third embodiment.

According to the aforementioned first to third embodiments, the luggage detected state is determined when the load detecting device 12 detects the load greater than the first load (for example, 6 kg) and smaller than the second load (for example, 11.5 kg). In addition, the passenger detected state is determined when the load detecting device 12 detects the load equal to or greater than the second load. When the load detecting device 12 detects the load smaller than the third load (for example, 5 kg) and the detection state elapses for a short time period such as 2 sec (first time period), the luggage detected state or the passenger detected state is shifted to the unoccupied-seat state. A minimum load (first load) serving as a threshold value for the determination of the luggage detected state and the third load serving as a threshold value for the transition to the unoccupied-seat state are not necessarily different from each other and may be identical.

In addition, the aforementioned threshold load values and elapsed times for determining the unoccupied-seat state, the passenger detected state, and the luggage detected state according to the aforementioned first to third embodiments are only examples and may be changed accordingly.

The first to third embodiments are not limited to have the aforementioned structures and may be appropriately modified or changed.

The seat belt warning device according to the first to third embodiments determines the seat occupancy state in response to the load detected by the load detecting device 12 and applies to the seat for a vehicle where the engagement of the seat belt is essential.

According to the aforementioned embodiments, in a case where the load detected by the load detecting device 12 becomes equal to or greater than the second load for the determination of the passenger seated on the seat 11 because of an influence of acceleration acting on the vehicle and the like even when, in fact, the luggage is placed on the seat cushion 11a of the seat 11, the wrong recognition that the passenger is seated on the seat 11 is avoidable and the warning signal indicating the disengagement of the seat belt 13 is prevented.

In addition, the determination of the luggage detected state or the passenger detected state is conducted when the vehicle is stopped, i.e., the acceleration and the like are not acting on the vehicle, thereby achieving the accurate determination.

The seat belt warning device 10 further includes the downhill determining portion 41 determining the vehicle stopped on a downhill surface and the load value correcting portion 42 correcting the load detected by the load detecting device 12 depending on a degree of the downhill surface in a case where the downhill determining portion 41 determines that the vehicle is stopped on the downhill surface.

Regardless of the inclination state of the vehicle, the determination of the unoccupied-seat state, the passenger detected state, or the luggage detected state is securely performed.

The controlling portion 15 performs the third transition process in which the luggage recognition mode is shifted to the passenger seating mode in a case where the load detecting device 12 detects the fourth load greater than the second load for the predetermined third time period.

Even when the luggage detected state is determined by the child seated on the forward portion of the seat 11, the determination of the seat occupancy is shifted to the passenger detected state when the child then changes his/her seating position to be seated in an appropriate manner on the seat 11. As a result, the warning against the disengagement of the seat belt 13 is securely conducted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat belt warning device comprising:
a seat belt restraining a passenger seated on a seat for a vehicle when the seat belt is in an engagement state and releasing the passenger when the seat belt is in a disengagement state;
a load detecting device including two load sensors that are provided at a rear portion of the seat and that are arranged away from each other in a width direction of the vehicle, the load detecting device detecting a load applied to a seating surface of the seat, the seat including a seatback at the rear portion of the seat;
a warning member warning the passenger to fasten the seat belt in response to the load detected by the load detecting device; and
a controlling portion determining one of an unoccupied-seat recognition mode where an unoccupied-seat state is recognized, a passenger seating recognition mode where it is determined that the passenger is seated on the seat and the warning member is allowed to operate, and a luggage recognition mode where it is determined that luggage is placed on the seat and the warning member is prohibited to operate,
the controlling portion performing a first transition process in which the unoccupied-seat recognition mode is shifted to the luggage recognition mode under a condition where the load detecting device detects the load greater than a first load and smaller than a second load and in which the luggage recognition mode is shifted to the unoccupied-seat recognition mode under a condition where the load detecting device detects the load smaller than a third load for a predetermined first time period,
the controlling portion performing a second transition process in which the unoccupied-seat recognition mode is shifted to the passenger seating recognition mode under a condition where the load detecting device detects the load equal to or greater than the second load and in which the passenger seating recognition mode is shifted to the unoccupied-seat recognition mode under a condition where the load detecting device detects the load smaller than the third load for the predetermined first time period,
wherein the controlling portion prevents a shift from the luggage recognition mode to the passenger seating recognition mode after the luggage recognition mode is determined, and prevents a shift from the passenger seating recognition mode to the luggage recognition mode after the passenger seating recognition mode is determined.

2. The seat belt warning device according to claim 1, wherein the controlling portion performs a third transition process in which the luggage recognition mode is shifted to the passenger seating mode in a case where the load detecting device detects a fourth load greater than the second load for a predetermined third time period.

3. A seat belt warning device comprising:
a seat belt restraining a passenger seated on a seat for a vehicle when the seat belt is in an engagement state and releasing the passenger when the seat belt is in a disengagement state;
a load detecting device including two load sensors that are provided at a rear portion of the seat and that are arranged away from each other in a width direction of the vehicle, the load detecting device detecting a load applied to a seating surface of the seat, the seat including a seatback at the rear portion of the seat;
a warning member warning the passenger to fasten the seat belt in response to the load detected by the load detecting device; and
a controlling portion determining one of an unoccupied-seat recognition mode where an unoccupied-seat state is recognized, a passenger seating recognition mode where it is determined that the passenger is seated on the seat and the warning member is allowed to operate, and a luggage recognition mode where it is determined that luggage is placed on the seat and the warning member is prohibited to operate,
the controlling portion performing a first transition process in which the unoccupied-seat recognition mode is shifted to the luggage recognition mode under a condition where the load detecting device detects the load greater than a first load and smaller than a second load within a predetermined second time period after an ignition switch is turned on and in which the luggage recognition mode is shifted to the unoccupied-seat recognition mode under a condition where the load detecting device detects the load smaller than a third load for a predetermined first time period;

the controlling portion performing a second transition process in which the unoccupied-seat recognition mode is shifted to the passenger seating recognition mode under a condition where the load detecting device detects the load equal to or greater than the second load within the predetermined second time period after the ignition switch is turned on and in which the passenger seating recognition mode is shifted to the unoccupied-seat recognition mode under a condition where the load detecting device detects the load smaller than the third load for the predetermined first time period, wherein the controlling portion prevents a shift from the luggage recognition mode to the passenger seating recognition mode after the luggage recognition mode is determined, and prevents a shift from the passenger seating recognition mode to the luggage recognition mode after the passenger seating recognition mode is determined.

4. The seat belt warning device according to claim 3, wherein the controlling portion performs a third transition process in which the luggage recognition mode is shifted to the passenger seating mode in a case where the load detecting device detects a fourth load greater than the second load for a predetermined third time period.

5. The seat belt warning device according to claim 3, further comprising a downhill determining portion determining the vehicle stopped on a downhill surface and a load value correcting portion correcting the load detected by the load detecting device depending on a degree of the downhill surface in a case where the downhill determining portion determines that the vehicle is stopped on the downhill surface.

6. The seat belt warning device according to claim 5, wherein the controlling portion performs a third transition process in which the luggage recognition mode is shifted to the passenger seating mode in a case where the load detecting device detects a fourth load greater than the second load for a predetermined third time period.

7. The seat belt warning device according to claim 1, further comprising a downhill determining portion determining the vehicle stopped on a downhill surface and a load value correcting portion correcting the load detected by the load detecting device depending on a degree of the downhill surface in a case where the downhill determining portion determines that the vehicle is stopped on the downhill surface.

8. The seat belt warning device according to claim 7, wherein the controlling portion performs a third transition process in which the luggage recognition mode is shifted to the passenger seating mode in a case where the load detecting device detects a fourth load greater than the second load for a predetermined third time period.

9. A seat belt warning device comprising:
a seat belt restraining a passenger seated on a seat for a vehicle when the seat belt is in an engagement state and releasing the passenger when the seat belt is in a disengagement state;
a load detecting device including two load sensors that are provided at a rear portion of the seat and that are arranged away from each other in a width direction of the vehicle, the load detecting device detecting a load applied to a seating surface of the seat, the seat including a seatback at the rear portion of the seat;
a warning member warning the passenger to fasten the seat belt in response to the load detected by the load detecting device; and
a controlling portion determining one of an unoccupied-seat recognition mode where an unoccupied-seat state is recognized, a passenger seating recognition mode where it is determined that the passenger is seated on the seat and the warning member is allowed to operate, and a luggage recognition mode where it is determined that luggage is placed on the seat and the warning member is prohibited to operate, the controlling portion performing a first transition process in which the unoccupied-seat recognition mode is shifted to the luggage recognition mode under a first condition,
wherein the first condition is where the load detecting device detects the load greater than a first load and smaller than a second load and in which the luggage recognition mode is shifted to the unoccupied-seat recognition mode under a second condition,
wherein the second condition is where the load detecting device detects the load smaller than a third load for a predetermined first time period, the controlling portion performing a second transition process in which the unoccupied-seat recognition mode is shifted to the passenger seating recognition mode under a third condition,
wherein the third condition is where the load detecting device detects the load equal to or greater than the second load and in which the passenger seating recognition mode is shifted to the unoccupied-seat recognition mode under a fourth condition,
wherein the fourth condition is where the load detecting device detects the load smaller than the third load for the predetermined first time period, the controlling portion performing a third transition process in which the luggage recognition mode is shifted to the passenger seated recognition mode under conditions where the load detecting device detects the load greater than a fourth load and where the load detecting device detects the load greater than the fourth load for a predetermined third time period.

10. The seat belt warning device of claim 9, wherein the controlling portion performing the first transition process in which the unoccupied-seat recognition mode is shifted to the luggage recognition mode wherein the first condition is where the load detecting device detects the load greater than a first load and smaller than a second load within a predetermined second time period after an ignition switch is turned on, and
wherein the controlling portion performing the second transition process in which the unoccupied-seat recognition mode is shifted to the passenger seating recognition mode wherein the third condition is where the load detecting device detects the load equal to or greater than the second load within the predetermined second time period after the ignition switch is turned on.

11. The seat belt warning device of claim 10, wherein the controlling portion prevents a shift from the passenger seated recognition mode to the luggage recognition mode after the passenger seated recognition mode is determined.

12. The seat belt warning device of claim 9, wherein the controlling portion prevents a shift from the passenger seated recognition mode to the luggage recognition mode after the passenger seated recognition mode is determined.

* * * * *